US007197436B2

(12) United States Patent
Dinu et al.

(10) Patent No.: US 7,197,436 B2
(45) Date of Patent: Mar. 27, 2007

(54) SYSTEM AND METHOD FOR MEASURING AUDIO PROCESSING ATTRIBUTES IN A COMPUTER SYSTEM

(75) Inventors: Daniel Dinu, Redmond, WA (US); Stephen Rowe, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/878,461

(22) Filed: Jun. 28, 2004

(65) Prior Publication Data

US 2005/0288905 A1 Dec. 29, 2005

(51) Int. Cl.
*G06F 15/00* (2006.01)

(52) U.S. Cl. ........................................ 702/189; 381/58

(58) Field of Classification Search ................ 702/189, 702/198; 725/105; 711/167; 714/762; 348/554; 381/26, 58; 351/210; 709/204

See application file for complete search history.

(56) References Cited

U.S. PATENT DOCUMENTS

| | | | | |
|---|---|---|---|---|
| 6,546,516 | B1 * | 4/2003 | Wright et al. | 714/762 |
| 2003/0215096 | A1 * | 11/2003 | Graumann et al. | 381/58 |
| 2005/0039215 | A1 * | 2/2005 | Lienhart et al. | 725/105 |
| 2005/0160247 | A1 * | 7/2005 | Dillon et al. | 711/167 |

* cited by examiner

*Primary Examiner*—Michael Nghiem
*Assistant Examiner*—Xiuqin Sun
(74) *Attorney, Agent, or Firm*—Christensen O'Connor Johnson Kindness PLLC

(57) ABSTRACT

A system and method for calculating audio processing attribute in digital signal processing system are provided. A testing system generates a multi-channel test signal in which one channel is returned to the testing system and the other channel is sent to a tested system. The test signals are processed, mixed and correlated. The resulting differences in the correlated signals are used to calculate various processing attributes of the tested system.

6 Claims, 6 Drawing Sheets

SYSTEM AND METHOD FOR MEASURING AUDIO PROCESSING ATTRIBUTES IN A COMPUTER SYSTEM

FIELD OF THE INVENTION

In general, the present application relates to computer software and audio processing systems, and in particular, to a system and method for measuring audio processing latency in audio processing system.

BACKGROUND OF THE INVENTION

Generally described, computer systems can utilize digital processing techniques to process audio data. As digital processing computer systems become more prominent and efficient, digital processing computer systems provide a possible alternative to traditional analog audio processing equipment. To assess whether a digital processing computer system can compete with traditional analog audio processing equipment, it is important to assess the performance of the digital processing computer system and make additional modifications to the system to improve performance.

One skilled in the relevant art will appreciate that digital processing techniques can introduce various digital signal processing attributes, such as audio signal processing latencies and/or software processing glitches, to an inputted digital audio signal. For example, some digital processing computer systems may introduce audio signal conversion processing attributes associated with converting an analog signal to a digital signal prior to processing the signal and/or converting the digital signal back an analog signal after the processing is complete. Additionally, some digital processing computer systems may also introduce audio signal processing attributes associated with buffering an incoming digital signal. Further, some digital processing computer systems may introduce other audio processing attributes, such as software latencies, associated with other delays/errors associated with the execution of audio processing software applications on the digital processing computer system.

One skilled in the relevant art will appreciate that one or more processing attributes associated with a particular digital processing computer system, such as the processing latencies, software latencies and the combination, may be unknown. In some instances, individual latencies may be tested, or otherwise measured, such as for latencies associated with a signal converter. In some instances, however, the audio processing attributes may be difficult to measure, such as software processing latencies. Further, individual testing of one or more latencies may not take into account any compound latencies associated with integrating multiple processing components on a digital processing computer system. Thus, there is a need for a system and method for measuring audio processing attributes for digital processing systems.

SUMMARY OF THE INVENTION

A system and method for calculating audio processing attribute in digital signal processing system are provided. A testing system generates a multi-channel test signal in which one channel is returned to the testing system and the other channel is sent to a tested system. The test signals are processed, mixed and correlated. The resulting differences in the correlated signals are used to calculate various processing attributes of the tested system.

In accordance with an aspect of the present invention, a method for determining audio processing latency is provided. In accordance with the method, a testing system generates a multi-channel test signal. The multi-channel test signal includes a first channel corresponding to a reference signal and a second channel corresponding to a processed signal. The testing computer system obtains the first channel signal and the second channel signal from a tested computer system. The testing computer system correlates the first and second channel signals. Additionally, the testing computer system calculates an audio processing latency from the tested computer system by comparing the first and second correlated channel signals.

In accordance with another aspect of the present invention, a system for determining audio processing latency is provided. The system includes a test signal generation component for generating a multi-channel test signal. The multi-channel signal includes a first channel corresponding to a reference signal and a second channel corresponding to a processing signal. The system also includes a test signal processing component that obtains the first channel signal from the test generation component. The test signal processing component obtains the second channel signal from a tested computer system. Additionally, the test signal processing component correlates the first and second channel signals and compares the correlated first and second channel signals.

In accordance with a further aspect of the present invention, a method for processing audio signal data is provided. In accordance with the method, a testing system generates a multi-channel test signal. The multi-channel test signal includes a first channel corresponding to a reference signal and a second channel corresponding to a processing signal. The testing system obtains the first channel signal and the second channel signal from a tested computer system. The testing system correlates the first and second channel signals and calculates an audio processing attribute from the tested computer system by comparing the first and second correlated channel signals.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Generally described, the present invention relates to a system and method for measuring audio processing attributes for audio processing computer systems. More specifically, the present invention relates to a system and method for measuring audio processing latencies and glitch detection in a digital processing system utilizing a multi-channel test signal. Although the present invention will be described with regard to an illustrative audio processing attribute testing, one skilled in the relevant art will appreciate that the present invention may be utilized to detect additional or alternative audio processing attributes. Additionally, although the present invention will be described with regard to audio processing attributes, one skilled in the relevant art will appreciate that one or more aspects of the present invention may be applied to processing digital signals associated with video or data transmission. Accordingly, the disclosed system embodiments, operating parameters and configurations are illustrative in nature and should not be construed as limiting.

Figure 1:
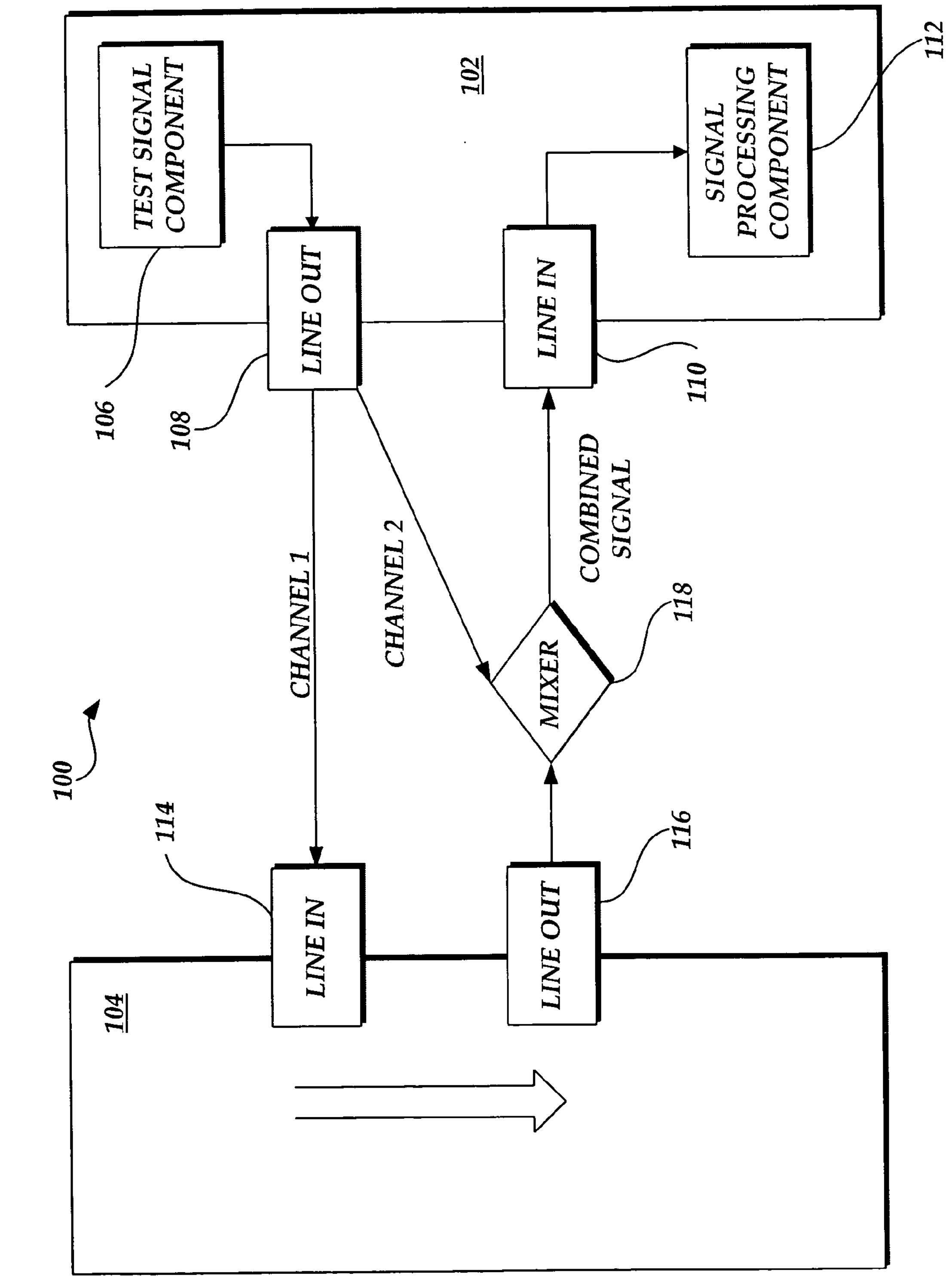
FIG. 1 is a block diagram illustrative of an audio processing attribute testing system including a testing computer system having a test signal generation component and a test signal processing component and a tested computing system in accordance with the present invention.

FIG. 1 is a block diagram illustrative of an audio processing attribute testing system 100 formed in accordance with an illustrative embodiment of the present invention. The audio processing attribute testing system 100 includes a testing computing system 102 having a number of components for generating and processing test signals. The audio processing attribute testing system 100 can also include one or more digital processing system, referred to as a tested computer system 104, that corresponds to the digital computer system being tested. In an illustrative embodiment of the present invention, the testing computer system 102 and the tested computer system 104 can correspond to one of a variety of computer systems, including, but not limited to, personal computing devices, server computing devices, personal digital assistants, mobile computer devices, specialized computing devices, mobile telephones, and the like.

As illustrated in FIG. 1, the testing computer system 102 includes a test signal generation component 106 for generating a two-channel test signal to be processed. The testing computer system 102 can also include a line out component 108 for processing the outgoing test signals. The line out component 108 can include a digital to analog converter and other signal processing sub-components for processing the outgoing test signals. In a similar manner, the testing computer system 102 can also further include a line in component 110 for processing incoming test signals. The line in component 110 can include an analog to digital converter and other signal processing sub-components for processing the incoming test signals. The testing computer system 102 can further include a signal processing component 112 for processing the incoming test signals from the line in component 110 and determining various audio processing attributes of the tested computer system 104, as will be described below.

With continued reference to FIG. 1, in an illustrative embodiment of the present invention, the tested computer system 104 includes a line in component 114 for processing incoming test signals from the testing system 102. As described above, the line in component 114 can include an analog to digital converter and other processing components for processing the incoming test signals. In a similar manner, the tested computer 104 includes a line out component 116 for transmitting a processed test signal. As described above, the line out component 116 can include a digital to analog converter and other processing components for transmitting the processed test signal. One skilled in the relevant art will appreciate that the tested computer system 104 can include any number of additional processing components such as hardware and software audio processing components that process the test signal between the line in component 114 and the line out component 116. As also illustrated in FIG. 1, the digital processing computer system 100 can also include an audio mixer 118 for processing the test signets prior to be inputted to testing computer system 102. One skilled in the relevant art will appreciate that the mixer 118 may be omitted from the digital processing computer system 100.

Figure 2:
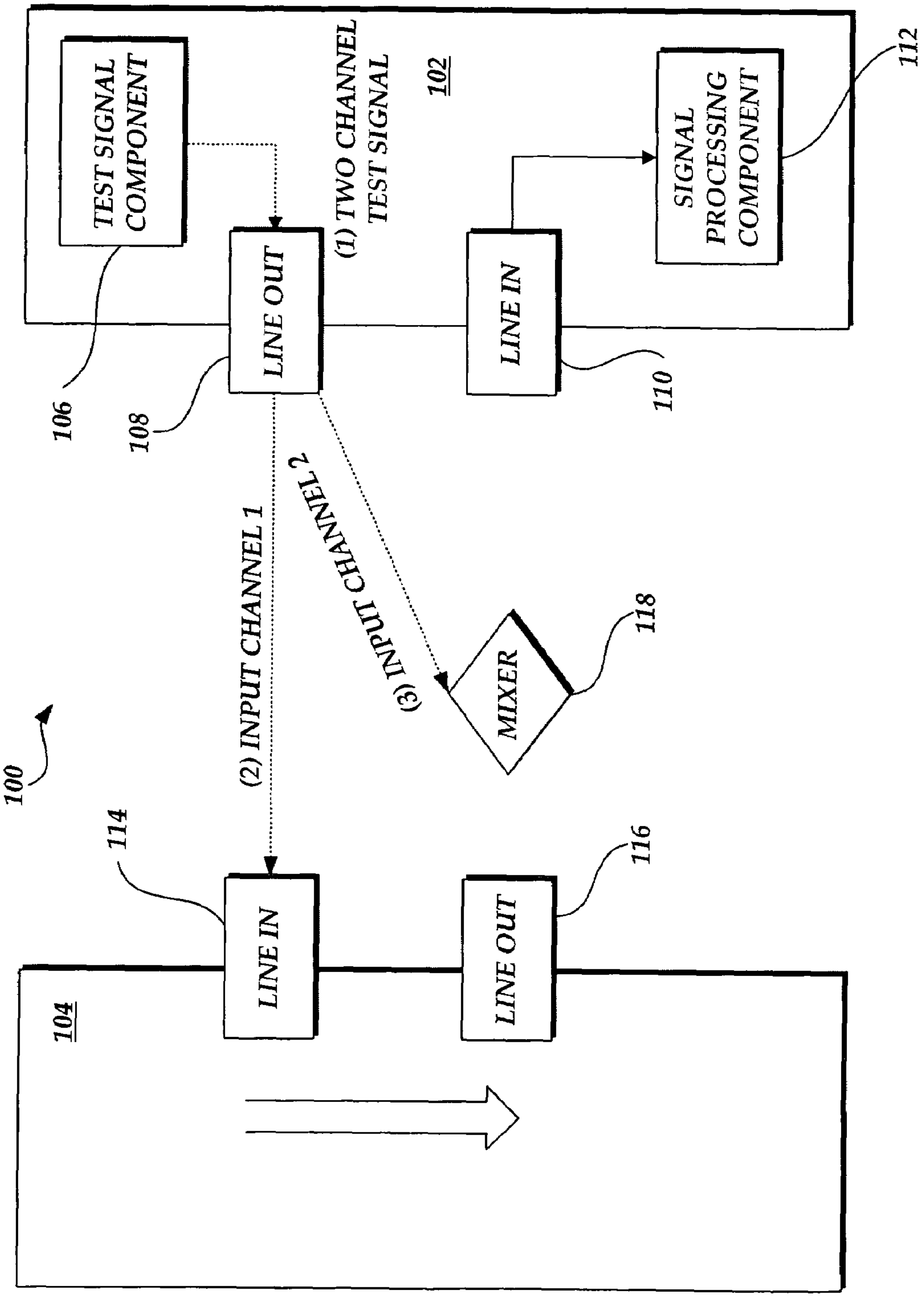
FIG. 2 is a block diagram of the audio processing attribute testing system of FIG. 1 illustrating the generation of a multi-channel testing signal by the testing computer system in accordance with the present invention.
Figure 3:
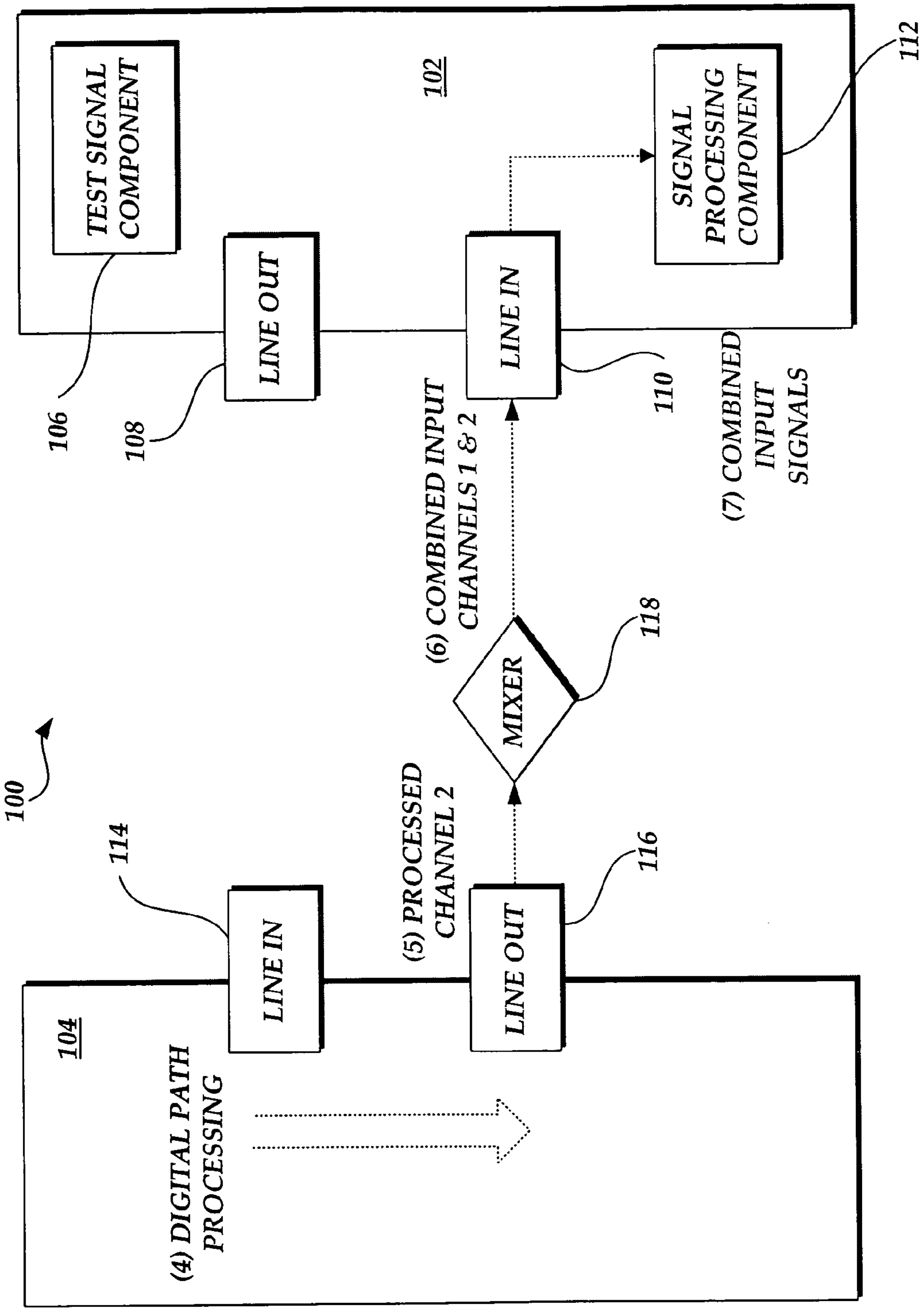
FIG. 3 is a block diagram of the audio processing attribute testing system of FIG. 1 illustrating the processing of the processing test signal from the tested computer system in accordance with the present invention.

With reference now to FIGS. 2 and 3, the processing and measurement of a test signal from the testing computer system 102 to the tested computer system 104 will be described. With reference to FIG. 2, the test signal component 104 generates a two-channel test digital signal that is received by the line out component 108. The line out component 108 converts the digital signal and transmits a two-channel analog test signal. As will be explained in greater detail below, the line out component 108 introduces a processing attribute. As illustrated in FIG. 2, a first channel from the analog test signal is sent to the line component 112 of the test computer system 104. Additionally, a second channel from the analog test signal is sent to the mixer 118.

With reference now to FIG. 3, the line in component 114 of the tested computer system 104 processes the incoming analog test signal and converts the signal to a digital signal. The digital signal is then processed by the tested computer system 104, which can include any type of digital signal processing, buffering and the like. The processed digital signal is then further processed by the line out component 116 of the tested computer system 104 into an analog signal. As will be explained in greater detail below, the processing of the digital signal at the line component 114, the additional processing by the tested computer system 104 and the processing of the analog signal at the line out component 116 may introduce additional processing attributes. With continued reference to FIG. 3, the mixer 118 receives the processed digital signal from the tested computer system 104. The mixer 118 mixes the analog signal from the testing computer system 102 (FIG. 2) and the analog signal from the tested computer system 104, which is received at the line in component 110 of the testing computer system 102. The line in component 110 processes the mixed analog signal into a digital signal, which may introduce additional processing attributes. The line-in component 110 transmits the digital mixed signal to the signal processing component 112. As will be described below, the signal processing component 112 then utilizes the mixed digital signal to identify one or more previously unknown processing attributes associated with the processing of the test signal by the tested computer system 104.

Figure 4:
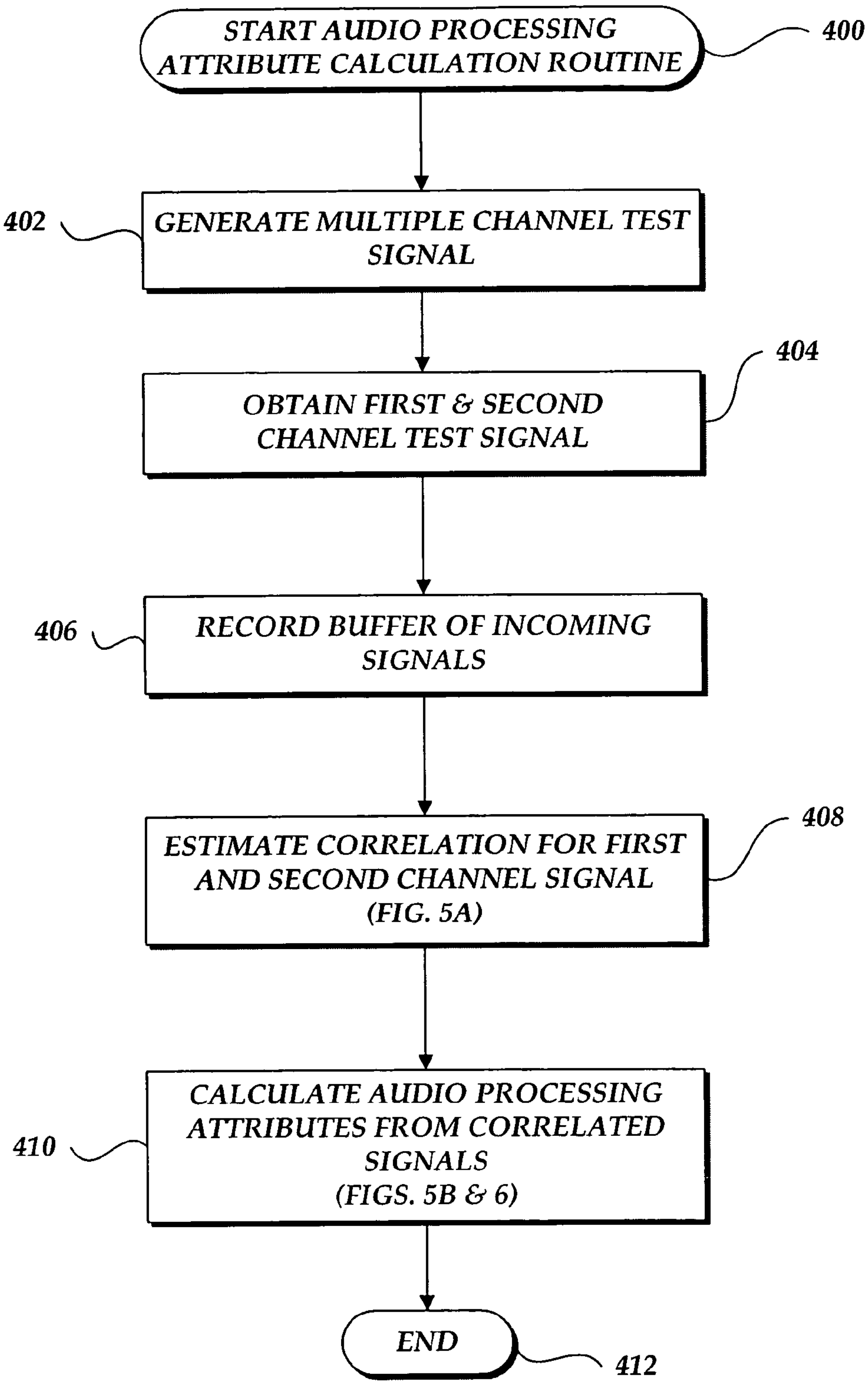
FIG. 4 is a flow diagram illustrative of an audio processing attribute calculation routine implemented by a testing computer system in accordance with the present invention.

FIG. 4 is a flow diagram illustrative of an audio processing attribute calculation routine 400 implemented by the testing computer in accordance with an illustrative embodiment of the present invention. At block 402, the test signal generation component 106 of the testing computer system 102 generates a multiple-channel test signal. In an illustrative embodiment of the present invention, the multiple-channel test signal corresponds to a maximum length sequence ("MLS") signal. One skilled in the relevant art will appreciate that an MLS signal has the properties such that it will only correlate when it is compared with itself at one particular point and will not correlate with noise or other comparison signals. Additionally, in an illustrative embodiment of the present invention, the length of the MLS signal is set at a value greater than the maximum expected delay (or other default value). In an illustrative embodiment of the present invention, the length of the test signal is 128 samples, although alternative length signals may also be used. Further, in an illustrative embodiment of the present invention, the test signal further corresponds to the MLS signal up to the maximum expected latency (e.g., 128 samples) and "silence" for the rest of the signal. Accordingly, the value of the test signal past the maximum latency would be a zero value. Still further, in an illustrative embodiment of the present invention, the test signal generation component 106 generates a two channel signal including the same MLS signal in each channel. In an alternate embodiment of the present invention, the test signal can include additional channels for testing multiple tested computer system 104 or performing additional signal processing tests.

At block 404, the signal processing component 112 obtains the first and second channel test signals. As illustrated in FIGS. 2 and 3, the first channel test signal corresponds to the output of the line out component 108 from the testing computer system 102. In an illustrative embodiment of the present invention, the first channel test signal is received by the mixer 118 and transmitted to the line component 110 of the testing computer system 102. As will be explained in greater detail below, the first channel test signal will include processing attributes, such a processing latencies, associated with the processing of the outgoing digital signal by the line out component 108 of the testing computer system 102 and the processing of the incoming analog signal by the line in component 110 of the testing computer system. As also illustrated in FIGS. 2 and 3, the second channel test signal corresponds to the output of the line out component 116 from the tested computer system 104. As will be explained in greater detail below, the second channel test signal will include processing attributes associated with the processing of the outgoing digital signal by the line out component 108 of the testing computer system 102 and the processing of the signals by the line in and line out components 114, 116 of the tested computer system 104. The second channel test signal can also include processing attributes associated with any additional processing attributes of the test signal by the tested computer system and the processing of the incoming analog signal by the line in component 110 of the testing computer system 102. In an illustrative embodiment of the present invention, the first and second channel test signals are received by the signal processing component 112 of the testing computer system 102 as a mixed signal from the mixer 118. Alternatively, the signal processing component 112 may receive each signal individually. At block 406, the signal processing component 112 records a buffer of the incoming test signals. In an illustrative embodiment of the present invention, the incoming test signals are buffered to prime each channel and eliminate latencies associated with buffering of the signals by the tested computer system 104.

Figure 5A:
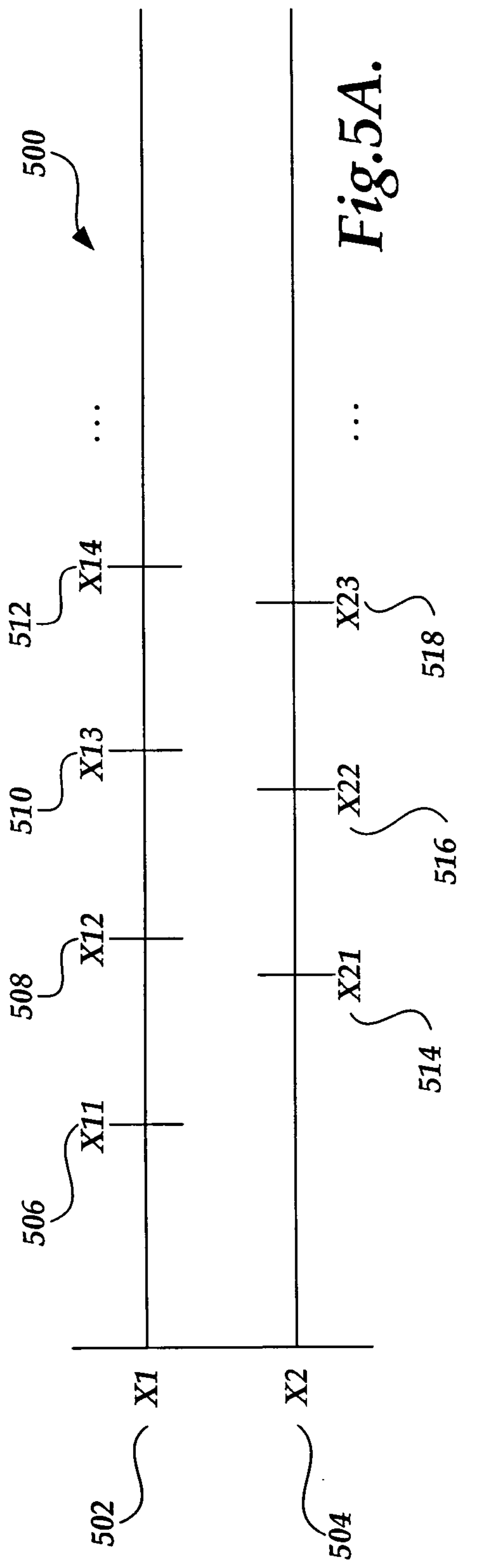
FIGS. 5A and 5B are graphs illustrative of inputted correlated signal graphs generated by the testing computer system for determining audio signal processing attributes in accordance with the present invention.

At block 408, the signal processing component 112 estimates a correlation for the first and second channel signals. As explained above, the test signal is selected based upon correlation properties that allows a signal to be correlated with itself. FIG. 5A is a graph illustrative of a signal processing graph 500 corresponding to a correlated inputted test signals according to time. The graph includes input for the first channel test signal 502 and the second channel test signal 504. As illustrated in FIG. 5A, the processing of the first channel test signal 502 generates correlation points 506, 508, 510, and 512 that correspond to a matching of the inputted first channel test signal, such as the MLS test signal, with the correlation signal. Similarly, the processing of the second channel test signal 504 generates points 514, 516, and 518 that correspond to a matching of the inputted second channel test signal, such as the MLS test signal, with the correlation signal.

At block 410, the signal processing component 112 calculates one or more processing attributes from the correlated signals. In an illustrative embodiment of the present invention, the output of the test signal from the test signal generation component 106 of the testing computer system 102 is defined by the function, S(n), of the MLS test signal. Equation (1) illustrates the output of both channels of the test signal from the test signal generation component 106 as follows:

$$\text{Channel } 1 = S(n)$$

$$\text{Channel } 2 = S(n) \tag{1}$$

As explained previously, the input of the test signals to the signal processing component 112 of the testing computer system 102 corresponds to the processing of the test signal function, S(n), by the transfer functions associated with processing attributes of the both the testing computer system 102 and the tested computer system 104. Equation (2) illustrates the input of the test channel signals at the signal processing component 112 of the testing computer system 102 as follows:

$$\text{Channel } 1 = S(n)*H_{taso}(n)*H_{mixer}(n)*H_{tasi}(n)$$

$$\text{Channel } 2 = S(n)*H_{taso}(n)*H_{suti}(n)*H_{sutp}(n)*H_{suto}(n)*H_{mixer}(n)*H_{tasi}(n) \tag{2}$$

Where:

$H_{taso}$(n) corresponds to the transfer function of the ADC converter from the line in component 110 of the testing computer system 102;

$H_{tasi}$(n) corresponds to the transfer function of the DAC converter from the line out component 108 of the testing computer system 102;

$H_{suti}$(n) corresponds to the transfer function of the ADC converter from the line in component 114 of the tested computer system 104;

$H_{sutp}$(n) corresponds to the transfer function of any additional software processes within the tested computer system 104

$H_{suto}$(n) corresponds to the transfer function of the DAC converter from the line out component 116 of the tested computer system 104;

$H_{mixer}$(n) corresponds to the transfer function of the mixer 118;

* corresponds to the convolution operator.

Based on a comparison of Equation (2), the processing attributes of the tested computer system 104 correspond to the transfer functions $H_{suti}$(n), $H_{sutp}$(n), and $H_{suto}$(n). The combined latency associated with the transfer functions can then measured by comparing the correlated signals between the first and second channel test signals 502, 504 (FIG. 5). The measurement is based upon an assumption that the absolute value of the distance from the correlated first channel test signals are equal to the absolute value of the distance from the correlated second channel test signals. Equation (3) illustrates the calculation of test signal latencies as follows:

$$\text{Latency(samples)} = X21 - X11 = X22 - X12 = X23 - X13$$

$$\text{Latency(ms)} = \text{Latency(samples)}/\text{Sample Rate(Hz)}/1000) \tag{3}$$

where

X1x=corresponds to the correlated points of the first channel test signal; and

X2x=corresponds to the correlated points of the second channel test signal.

Figure 5B:
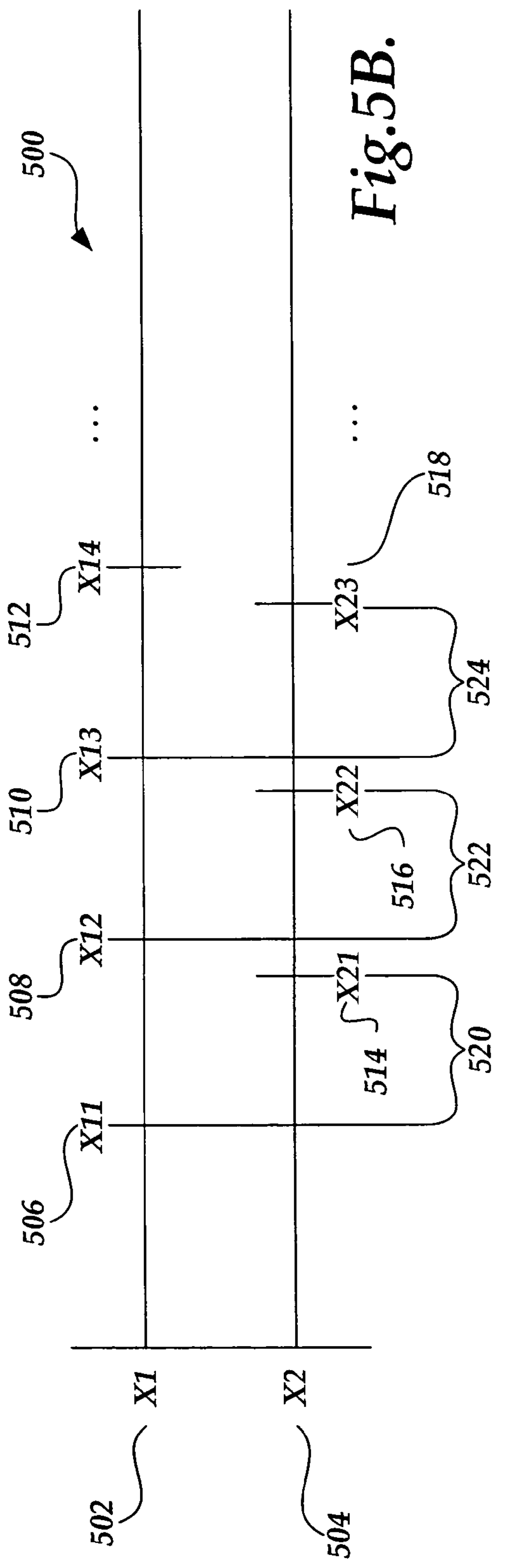

FIG. 5B is graph of the signal graph 500 of FIG. 5A illustrating the calculation of digital signal processing latencies according to Equation (3). As illustrated in FIG. 5B, the different between correlated points 514 and 506 correspond to the latency 520 between the first and second channel signal. Likewise, the different between correlated points 516 and 508 correspond to the latency 522 between the first and second channel signal. Similarly, the different between correlated points 518 and 510 correspond to the latency 524 between the first and second channel signal. In an illustrative embodiment of the present invention, latencies 520, 522 and 524 are assumed to be substantially equal. Accordingly, the signal processing component 112 need only to calculate a signal latency to complete the processing.

In an alternative embodiment of the present invention, the signal processing component 112 can calculate a number of signal latencies, such as latencies 520, 522, and 524, to test for additional processing attributes of the tested computer system 104. In accordance with this embodiment, the signal processing component 112 calculates each latency and calculates any differences in latencies. In the event that the latencies are not equal, or substantially equal, the difference in latencies can be associated with a drift in the tested computer system 104 and measured as another processing attribute of the tested computer system.

In accordance with the above described illustrative embodiment of the present invention, the amplitude of the correlated test signal points 506–518, are assumed to be equal, or substantially equal. In accordance with an alternative embodiment of the present invention, the signal processing component 112 of the testing computer system 102 can also utilized the correlated signals 502, 504 to test for software glitches in the tested computer system 104 that diminish the test signal.

Figure 6:
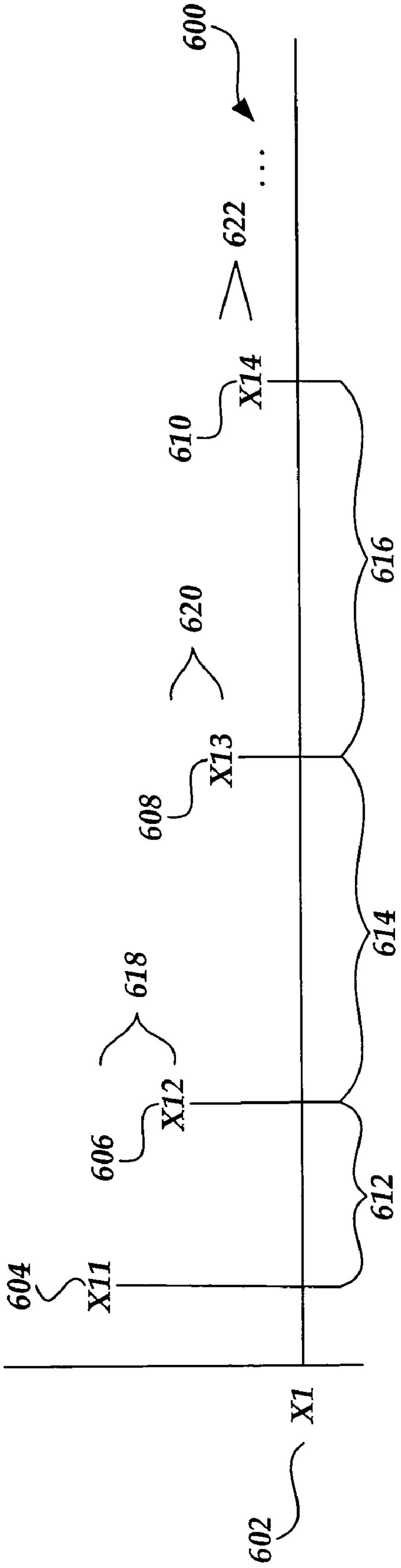
FIG. 6 is a graph illustrative of a correlated signal processing graph generated by the testing computer system for determining audio signal processing attributes in accordance with the present invention.

FIG. 6 is a graph illustrative of a signal graph 600 from a correlated test signal 602. Similar to signal graph 500 (FIG. 5), the correlated test signal 602 includes a number of correlated points 604, 606, 608, and 610 that correspond to a matching of the inputted test signal, such as an MLS signal, with the correlation signal. As illustrated in FIG. 6, in a first alternate embodiment, the latencies of the test signal 602 are represented by distances 612, 614 and 616. In this embodiment, the difference between the latencies 612, 614 and 616 are representative of other processing attributes, such as drift or software glitches. With continued reference to FIG. 6, each of the correlation points 604–610 have an amplitude of the correlated signal. In accordance with a second alternate embodiment, the difference in amplitude between the correlation points 604–610, represented by distances 618–622 is representative of other processing attributes, such as software glitches. Although FIG. 6 illustrates two alternate embodiments, one skilled in the relevant art will appreciate that each alternate embodiment may be separately applicable or used in combination with other testing embodiments.

Returning again to FIG. 4, at block 412, the routine 400 terminates.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A method for determining audio processing latency, the method comprising:

generating a multi-channel test signal, wherein the multi-channel test signal includes a first channel corresponding to a reference signal and a second channel corresponding to a processing signal in a tested computer system;

obtaining the first channel signal;

obtaining the second channel signal from a tested computer system;

correlating the first and second channel signals;

calculating an audio processing latency from the tested computer system by comparing the first and second correlated channel signals;

outputting the audio processing latency in a testing computer system; and wherein the multi-channel test signal corresponds to a maximum length sequence having a fixed length greater than an expected maximum latency of the tested computer system.

2. The method as recited in claim 1, wherein the fixed length of the signal is greater than 128 samples.

3. A system for determining audio processing latency, the system comprising:

a test signal generation component for generating a multi-channel test signal, wherein the multi-channel signal includes a first channel corresponding to a reference signal and a second channel corresponding to a processed signal in a tested computer system; and a test signal processing component for obtaining the first channel signal from the test generation component, for obtaining the second channel signal from the tested computer system, for correlating the first and second channel signals and for comparing the correlated first and second channel signals in order to calculate an audio processing latency from the tested computer system;

a signal output component for outputting the calculated audio processing latency in a testing computer system; and wherein the multi-channel test signal corresponds to a maximum length sequence having a fixed length greater than an expected latency of the tested computer system.

4. The system as recited in claim 3, wherein the fixed length of the signal is greater than 128 samples.

5. A method for processing audio signal data, the method comprising:

generating a multi-channel test signal, wherein the multi-channel test signal includes a first channel corresponding to a reference signal and a second channel corresponding to a processed signal in a tested computer system;

obtaining the first channel signal;

obtaining the second channel signal from the tested computer system;

correlating the first and second channel signals;

calculating an audio processing attribute from the tested computer system by comparing the first and second correlated channel signals;

outputting the audio processing attribute in a testing computer system; and wherein the multi-channel test signal corresponds to a maximum length sequence having a fixed length greater than an expected latency of the tested computer system.

6. The method as recited in claim 5, wherein the fixed length of the signal is greater than 128 samples.

* * * * *

UNITED STATES PATENT AND TRADEMARK OFFICE

CERTIFICATE OF CORRECTION

PATENT NO. : 7,197,436 B2
APPLICATION NO. : 10/878461
DATED : March 27, 2007
INVENTOR(S) : Daniel Dinu et al.

It is certified that error appears in the above-identified patent and that said Letters Patent is hereby corrected as shown below:

In column 8, line 2, in Claim 1, delete "processing" and insert -- processed --, therefor.

In column 8, line 5, in Claim 1, after "from" delete "a" and insert -- the --, therefor.

Signed and Sealed this

Twentieth Day of July, 2010

David J. Kappos
*Director of the United States Patent and Trademark Office*